United States Patent [19]

Kumada

[11] 3,953,109

[45] Apr. 27, 1976

[54] DOMAIN SWITCHING ELEMENT

[75] Inventor: Akio Kumada, Kokubunji, Japan

[73] Assignee: Hitachi, Ltd., Japan

[22] Filed: Mar. 7, 1974

[21] Appl. No.: 449,078

[30] Foreign Application Priority Data

Mar. 7, 1973 Japan............................... 48-26116

[52] U.S. Cl.......................... 350/160 R; 340/173.2; 350/150
[51] Int. Cl.².......................................... G02F 1/05
[58] Field of Search.................... 350/150, 160, 157; 340/173.2

[56] References Cited
UNITED STATES PATENTS

| 3,701,585 | 10/1972 | Barkley et al.............. | 350/150 |
| 3,732,549 | 5/1973 | Barkley...................... | 350/150 |
| 3,781,086 | 12/1973 | Kumada et al.............. | 350/150 |

Primary Examiner—John K. Corbin
Assistant Examiner—Richard A. Rosenberger
Attorney, Agent, or Firm—Craig & Antonelli

[57] ABSTRACT

In an irregular ferroelectric crystal plate having a domain switching element, the domain is made to grow unilaterally in a desired direction only, so that the domain wall is made movable in a desired direction only. The invention pertains also to a method of operating such element and to a method of making the same.

9 Claims, 12 Drawing Figures

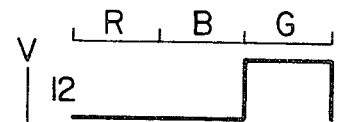
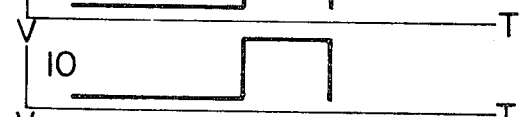
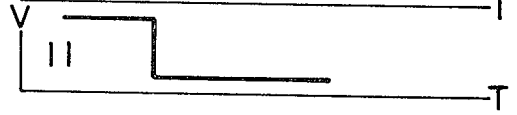
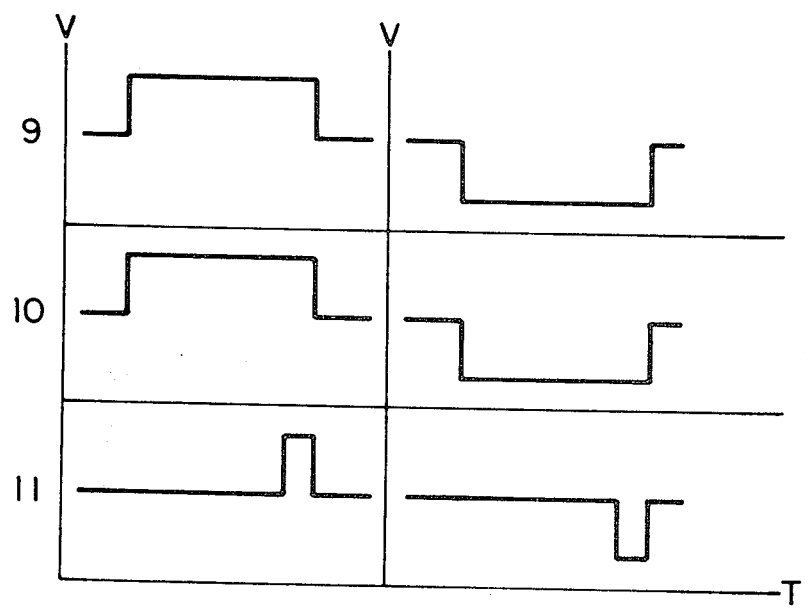

DOMAIN SWITCHING ELEMENT

BACKGROUND OF THE INVENTION

Field of the Invention

The present invention relates to elements capable of controlling domain switching in irregular ferroelectric devices.

Domain switching is a switching phenomenon between two single-domain states for positive and negative polarizations, that is, a phenomenon involving polarization reversal.

The term irregular ferroelectrics is a general term for a ferroelectric substance of a nature such that the spontaneous strain switches from one orientation to another according to the state of polarization. Some of the crystals belonging to the point groups mm2, 2-I and 2-II are the ferroelectric crystal which falls under the category of irregular ferroelectric crystals. These irregular ferroelectric crystals are summarized in Table I below.

Table 1

| Point Group | Ferroelectric Crystals |
|---|---|
| mm2 | $KH_2PO_4$, $Gd_2(MoO_4)_3$, boracite |
| 2-I | |
| 2-II | rochelle salt, ammonium cadmium sulfate, methyl ammonium aluminum sulfate 12-hydrate |

As will be evident from Table 1, crystals classified under the category irregular ferroelectrics are optically biaxial double refractive crystals. In an irregular ferroelectric crystal, polarization reversal causes a re-orientation of crystallographic axis. In a $Gd_2(MoO_4)_3$ single crystal, for example, the ferroelectric axis is coincident with the c-axis, and the spontaneous polarization is parallel or contra-parallel with the c-axis according to polarity. Hence, when a threshold voltage is applied to this $Gd_2(MoO_4)_3$ single crystal, the polarization is switched according to its polarity and, at the same time, this switching gives rise to a change in the crystal itself which is brought about by rotating the a-axis and b-axis on the c-axis through 90°. With this change, the biaxial double refraction characteristic also changes.

If these switching and optical characteristics inherent in the irregular ferroelectric crystal are utilized, a highly useful bistable optical switch can be realized by suitably growing, stopping growing or extinguishing the single domain which has a specific polarity in the irregular ferroelectric single crystal plate.

BRIEF DESCRIPTION OF THE DRAWINGS

FIGS. 6a, 6b and 6c are diagrams showing the phase relations for one cycle of voltage pulses applied to the individual voltage application terminals of the color modulator shown in FIG. 4b, FIGS. 8a and 8b are diagrams showing the phase relations among terminals regarding the voltage pulse applied to drive the image erasing element.

DESCRIPTION OF THE PRIOR ART

The present inventor previously proposed a domain switching element in U.S. Pat. Ser. No. 16,199 filed Mar. 30, 1970 and assigned to the assignee of the present application in which an irregular ferroelectric single crystal plate is used to arbitrarily grow, stop growing or extinguish a given single domain. More specifically, this switching element uses an irregular ferroelectric c-plate, in which single domains with polarities opposite to each other are disposed, so that their regions which perform domain switching are located in the center, and both side portions which extend in the <110> direction are diverted from each other, and an electrode for applying a voltage for selecting the polarity of domain switching is installed on each of the top and bottom c-surfaces of the domain switching region. The switching performed in this switching element is a phenomenon in which the domain wall, which is a boundary between a positive domain and a negative domain, moves through the crystal plate at a given speed depending on the electric field applied. The domain wall assumes a perfect plane because it constitutes the <110> plane of the crystal. Also, the crystal plate for the element is a rectangular c-plate formed by cutting the crystal edge along the <110> direction. Accordingly, the domain wall is disposed in parallel with the edge of the crystal plate. This domain wall travels through the crystal plate in a direction perpendicular to the applied electric field.

Figure 1:
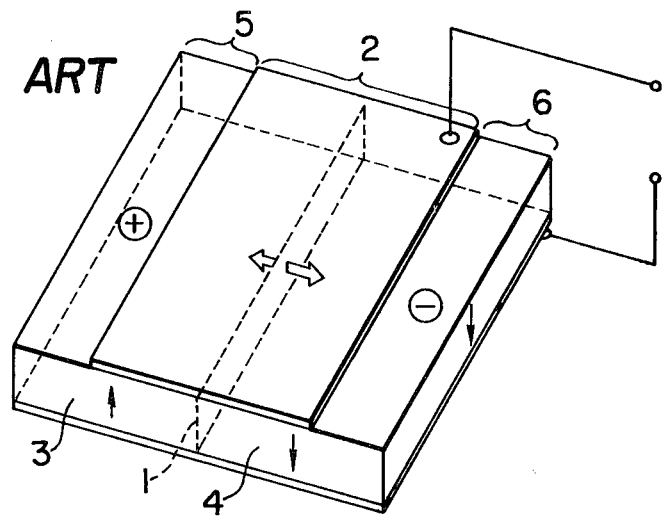
FIG. 1 is an illustration showing the structure of a domain switching element formed in such a manner that a rectangular plate of $Gd_2(MoO_4)_3$ single crystal c-plate cut along <110> direction is coated with transparent electrodes, and the electrode in the periphery of two arms parallel with the domain wall (as indicated by the dotted line) is removed after a conjugate domain state is established.

This domain movement may be observed as a sliding door moves as it is opened and closed. Referring to FIG. 1, an irregular ferroelectric c-plate has one domain wall 1 in its switching region 2, to which a voltage is applied. One side 3 of the domain wall is positive, and the other side 4 negative. When a positive voltage is applied to the switching region, a positive domain grows in the switching region, and the domain wall 1 moves into the negative domain 4. When a negative voltage is applied to the switching region, a negative domain grows and the domain wall 1 moves into the positive domain 3.

In other words, if one assumes that the domain 3 on the left of the domain wall is positive, and the domain 4 on the right thereof is negative, then the domain wall moves to the right by the application of a positive voltage, or to the left by the application of a negative voltage. Namely, the direction in which the domain wall moves depends on the polarity of the nucleus region on either side of the domain wall; it cannot be moved in the reverse direction. In the domain switching element as shown in FIG. 1, nucleus regions 5 and 6 are present in the crystal plate region in both edge portions of the switching region 2 where there is no electrode coating. A state where the two nucleus regions stand at opposite polarities is established so that one of the nucleus regions assumes a positive domain, and the other assumes a negative domain. This is the state of conjugate domains. Since the nucleus domain region is not coated with an electrode, the voltage applied to the switching region does not reach the nucleus regions. Hence the conjugate domain state remains stable and fixed regardless of the polarity of the switching region. This is a condition necessary to maintain smooth switching. In the structure where no nucleus regions are present and the entire top and bottom main surfaces are coated with electrodes on the crystal plate, it is likely to cause the crystal plate to be damaged upon switching by an AC voltage applied thereto.

Therefore, in the prior art domain switching element disclosed in the above referred to U.S. Ser. No. 16,199, the domain wall moving direction is uniquely determined by the voltage applied, because fixed positive and negative single domains are disposed on both sides, respectively, of the switching region.

SUMMARY OF THE INVENTION

Therefore, a first object of the invention is to provide a domain switching element permitting the domain wall moving direction to be arbitrarily controlled.

A second object of the invention is to provide a method of operating a domain switching element so that the domain wall can be moved in one direction only, that is, the domain wall can be controlled to move in either right or left-hand directions.

A third object of the invention is to provide a method of making domain switching elements suited for the first and second objects of the invention.

Briefly, the domain switching element of the invention consists essentially of an irregular ferroelectric c-plate in which multi-domain regions which have been grown by fixed strain, being isolated from each other and extending adjacent to each other, are located in both the <110> end portions opposite to each other, in a given domain switching region. Transparent electrodes are installed on the top and bottom c-surfaces of the irregular ferroelectric c-plate. The transparent electrode on one side of the c-surface comprises three electrode portions, of which two are coated on the domain switching region c-surface in two <110> ends, respectively, each electrode being distant from the nucleus region by a given gap. The remaining one of the three electrodes is coated on the c-surface of the two nucleus regions. On the other side of the c-surface a transparent electrode is coated on the domain switching region c-plane.

In this specification, $Gd_2(MoO_4)_3$ is used as the irregular ferroelectric material for the sake of explanatory simplicity. Other irregular ferroelectrics may be used for the purpose of the invention in similar manner and to the same effect as described in the examples taken hereinafter.

DESCRIPTION OF THE PREFERRED EMBODIMENTS

Example 1

A square plate, 20 mm × 20 mm, with its four sides oriented in the <110> direction, was prepared from a $Gd_2(MoO_4)_3$ single crystal by cutting it perpendicular to the c-axis and optically polishing the c-plate on both c-planes to a thickness of about 200μm. Two LiF coating layers of striped shape, 0.5 mm wide, about 2μm thick, were formed 1 mm apart from each other by evaporation, on one of the c-planes along two opposite sides. This sample was heated to a temperature of 500°C in an electric furnace. Then NESA (commercial brand name) solution consisting essentially of $SnCl_4$ was sprayed onto the entire surface of the sample to a thickness of about 4000 A. The NESA solution is deposited as a transparent electrode on the crystal surface, in the form of a film of which the transparency is greater than 95 percent and the electric resistance is less than 100Ω/square. In this process the LiF film reacts with the crystal surface. The crystal plate was then thoroughly washed with water after it was cooled to room temperature. By the washing step, excess LiF, together with the NESA film is removed. Thus, the NESA electrode in the striped portion where LiF is deposited is removed. In this striped portion, a reaction layer comprising $LiGd(MoO_4)_2$, formed as a result of the reaction of LiF on the crystal, is formed on the surface of the crystal. This reaction layer introduces a strain into the crystal. Because a force is exerted in the crystal plate to reduce the strain, only the narrow striped portions assume a multi-domain structure at room temperature.

Figure 2:
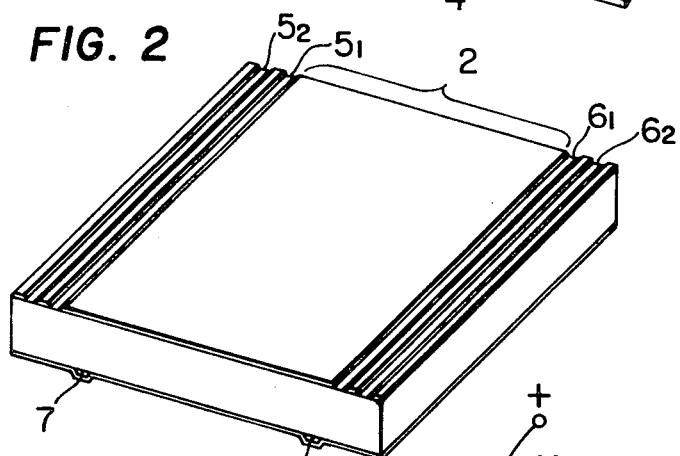
FIG. 2 is an illustration showing a switching element of multi-domain structure having a nucleus region, the switching element being fabricated in such a manner that an alkali haloid film is formed on the crystal surface by evaporation, in the form of a stripe in the direction of the domain wall, and the sample is coated with transparent electrodes causing a chemical reaction with the surface of the crystal, and then the sample is washed with water.

This multi-domain structure constitutes a nucleus region capable of making smooth switching possible. As is shown in FIG. 2, two striped-shaped nucleus regions $5_1$ and $5_2$, spaced from each other by a distance of 1mm therebetween, and two striped-shaped nucleus regions $6_1$ and $6_2$, spaced from each other by a distance of 1 mm therebetween, are installed in the side peripheral portions aligned in the <110> direction of a switching region 2 which is 16 mm in width and 20 mm in length. The top surface of the switching region 2 is coated with NESA electrode.

On the other c-plane of the crystal plate, after the above steps striped-shaped aluminum deposition layers 7 and 8, each being 100 μm wide, are installed in the switching region in positions 2.5 mm apart from the two <110> side portions, respectively, in parallel with the direction along which the striped shaped nucleus regions extend. Then the sample is heated to a temperature of 500°C in an electric furnace, NESA electrodes are coated on the c-plane (on the side of aluminum deposition layer), the sample crystal plate is cooled and immersed in NaOH 1/10 normal solution, and the aluminum and the NESA electrode in the aluminum portion are removed. This element is illustrated in the perspective view of FIG. 3, in which NESA electrodes 10, 9 and 11 are formed in the switching region and on the two nucleus region c-plane.

Figure 3:
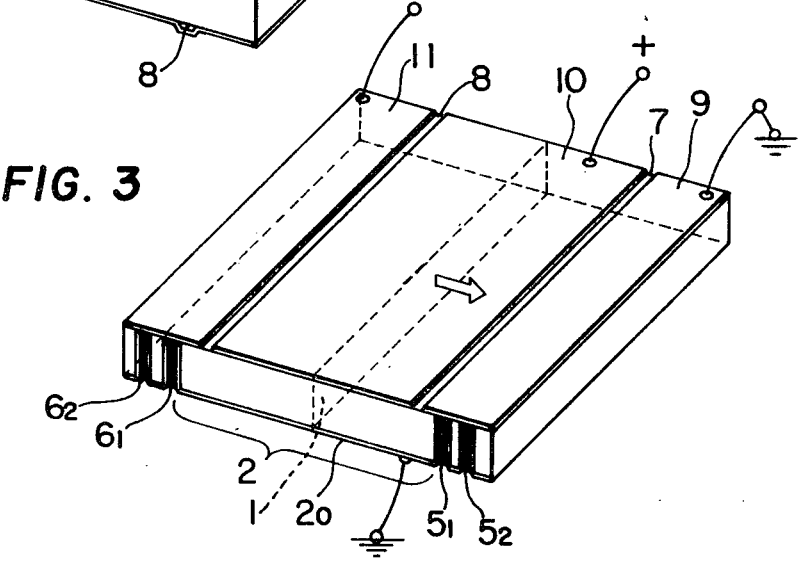
FIG. 3 is a diagram illustrating the fundamental of the construction of a domain switching element realized according to the invention.

Then the sample element is thoroughly washed with water and dried. Lead wires are connected to the NESA electrodes $2_0$ 10 on the switching region 2 and to the NESA electrodes 9 and 11 on the nucleus regions, and then a voltage source is connected to the lead wires. This resulting domain switching element with the structure is shown in FIG. 3. In this example, 2 pairs (sets) of multi-domain regions are installed in the domain switching element. Instead of this example, one or 3 sets of 3 or more of multi-domain regions may be used. and 10

In this domain switching element, the domain wall can be moved in one direction only in the manner described below.

EXAMPLE 2

In the domain switching element of which the fundamental structure is as shown in FIG. 3, the following operation takes place.

1. The first switching electrode $2_o$ coated on the entire bottom surface of the domain switching region is kept at zero potential, the electrode 9 on the first nucleus domain regions (hereinafter briefly referred to as the first nucleus domain electrode), the electrode 11 on the second nucleus domain regions (hereinafter briefly referred to as the second nucleus domain electrode), and the electrode 10 installed on the top surface of the switching region between the first and second nucleus domain electrodes (hereinafter briefly, the second switching electrode) are kept at the same potential. Then a positive (or negative) DC voltage is applied and the voltage is progressively increased. By this operation, the spontaneous polarization of the domain switching region in the switching element is converted to a single polarity.

2. After the operation (1) above, the domain wall of the domain switching element can be moved consecutively toward the first nucleus domain or the second nucleus domain in the following manner. The electrode on the nucleus domain on the side where the domain wall is started (hereinafter briefly, the starting side nucleus domain electrodes), and the second switching electrode on the switching region are kept at the same potential, and the first switching electrode and the electrode on the nucleus domain on the side where the domain wall vanishes (hereinafter briefly, the vanishing side nucleus domain electrode) are kept at zero potential. As a result, a negative (or positive) domain grows in the direction from the starting side nucleus domain to the domain switching region. Thus, the domain wall 1 moves into the domain switching region and is trapped in the gap between the vanishing side nucleus domain and the domain switching region.

3. Then, by changing the potential of the vanishing side nucleus domain electrode to the same potential of the second switching electrode, the domain wall 1 moves from the trapped position toward the vanishing side nucleus domain and is finally absorbed by the multi-domain of the nucleus domain region.

After the above steps, an inverted voltage is applied to the domain switching element in the same sequence as (1), (2) and (3) above, with the foregoing potential relations among the electrodes kept unchanged. By repeating this operation periodically, the domain wall 1 can always be moved only toward the vanishing side nucleus domain from the starting side nucleus domain.

The domain structure of the nucleus domain of this domain switching element is a multi-domain structure generated by strain. Accordingly, when the number of domains decreases as the result of the above repeating operation, the strain energy increases. To reduce the influence by the strain, the multi-domain structure having many domains is restored. In other words, a domain wall can be repeatedly generated and moved in one direction only in the domain switching element of this invention.

The domain switching element of this invention may be used to constitute a color modulator of the type operated on every primary color frame in sequence, the modulator being adapted to use in the video camera of mono-lens system. A method of constructing such modulator and its operation will be described in Example 3 below.

EXAMPLE 3

In Examples 1 and 2, the fundamental structure of the domain switching element of the invention and its operating procedures are described. Example 3 refers to a concrete application based on the principles illustrated in Example 1.

The top and bottom c-planes of two $Gd_2(MoO_4)_3$ single crystal c-plates are optically polished to thicknesses of 210 $\mu$m and 195 $\mu$m respectively whereby a crystal plate of 20 × 20 mm square, with its four sides oriented in the <110> direction, is formed. Two striped-shaped LiF layers (alkali haloid, 0.5 mm wide, about 2$\mu$m thick, and 1 mm apart from each other, are formed by evaporation in each of two opposite side portions on one of the c-plane (hereinafter briefly referred to as the top c-surface) along one side, 20 mm in length, of the crystal plate. This sample element is heated to about a temperature of about 500°C in an electric furnace. After this process, NESA solution is sprayed onto the entire top c-surface, to coat a transparent electrode thereon. The element crystal plate is cooled to room temperature and thoroughly washed with water, whereby the portion where LiF is deposited becomes a nucleus region of multi-domain structure. The area between a pair of nucleus regions on the element crystal plate is the switching region.

A striped-shaped aluminum (or suitable metal) deposition layer, 100$\mu$m wide, is formed in the position 2.5mm inward from one of two opposite side portions, along the nucleus domain region, on the other c-surface (hereinafter briefly, back c-surface of the element crystal plate. In this manner, two aluminum layers are formed on the back c-surface of the element crystal plate. This sample is heated to a temperature of 500°C in an electric furnace, and then NESA solution is sprayed onto the back c-surface to coat a transparent electrode thereon. The sample is cooled to room temperature and is placed in NaOH 1/10 normal solution, whereby the aluminum and the transparent electrode in the aluminum portion are removed and thus three transparent electrodes, 100$\mu$m apart from each other (i.e., electrode gap) are formed on the back surface. The element crystal plate thus constructed is thoroughly washed with water and then dried. Electric lead wires are connected to the electrode on the back c-surface of the switching region and to the electrodes on the back side of the nucleus regions, whereby a domain switching element of the same structure as in FIG. 3 is obtained.

Figure 4A:
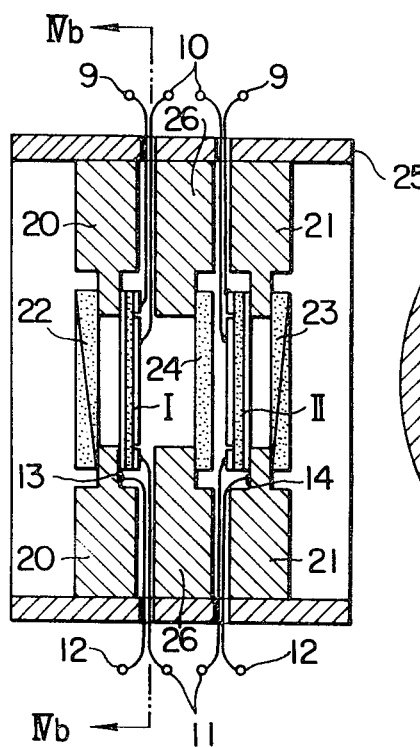
FIGS. 4a and 4b are respective lateral and longitudinal sectional diagrams showing a color modulator for a mono-lens system video camera for which the domain switching element of the invention is utilized.
Figure 4B:
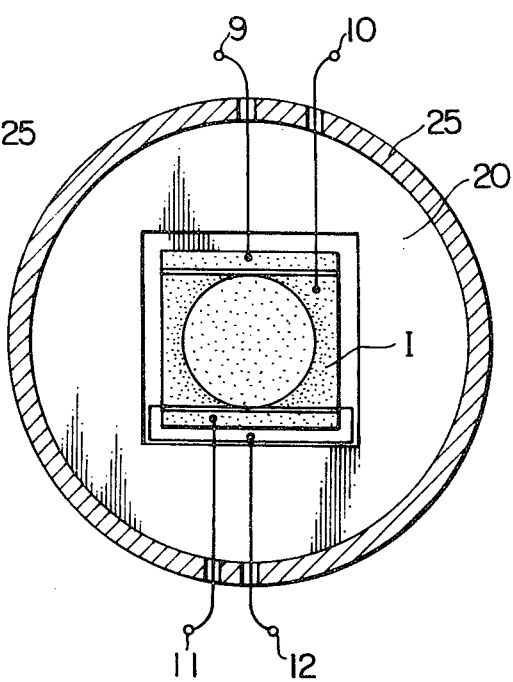

In the above manner, indium is deposited by evaporation, to a position coincident with at least one side edge of the nucleus domains located at two opposite sides on the top c-surface of each of the elements I and II, as shown in FIGS. 4a and 4b. The areas where indium is deposited on the c-surfaces of the switching elements I and II are tightly bonded and fixed to the support bases 20 and 21, respectively, on which indium is deposited by evaporation, as shown in FIGS. 4a and 4b. Terminals are installed in the element support portions 13 and 14 of the support bases 20 and 21 and in the areas where electrodes are installed on the elements I and II. Thus, lead wires 9, 10, 11 and $2_o$, which are connected to the electrodes on the back c-surfaces of the elements I and II, on which aluminum stripes 7 and 8 have been evaporated and removed, are connected to terminals 9,10,11 and 12 respectively. As is shown in FIG. 4a, the a-axis and b-axis of the polarization switching elements I and II are inserted in an optically diagonal position between a polarizer 22 and an analyzer 23 which are positioned perpendicular to each other. (Note: The optically diagonal position is such that the a-axis and b-axis of the switching element form an angle of 45° with the polarization plane of the polarizer). A quartz x-plate 24 (or more generally, a double refraction plate) having an optically polished surface, 133μm thick, and the polarization switching elements I and II are inserted in cascade between the polarizer 22 and the analyzer 23. The position of the quartz x-plate may be either upstream or downstream, in an optical sense of the polarization switching elements, as long as it is in an optically diagonal position with respect to the polarizer and the analyzer. The polarization switching elements I and II and the double refraction plate are to be so thick that the total retardation assumes a value at which an interference color due to double refraction is on the second to the fifth order, and that when the elements I and II are switched, the total retardation (i.e. addition or subtraction on the double refraction light beams passing through these crystal plates) is changed and thereby three colors, red (briefly, R), green (briefly, G) and blue (briefly, B) are obtained. A color modulator for mono-lens system video camera may be realized by housing the polarization switching elements and the double refraction crystal plate in a case 25.

Figure 5:
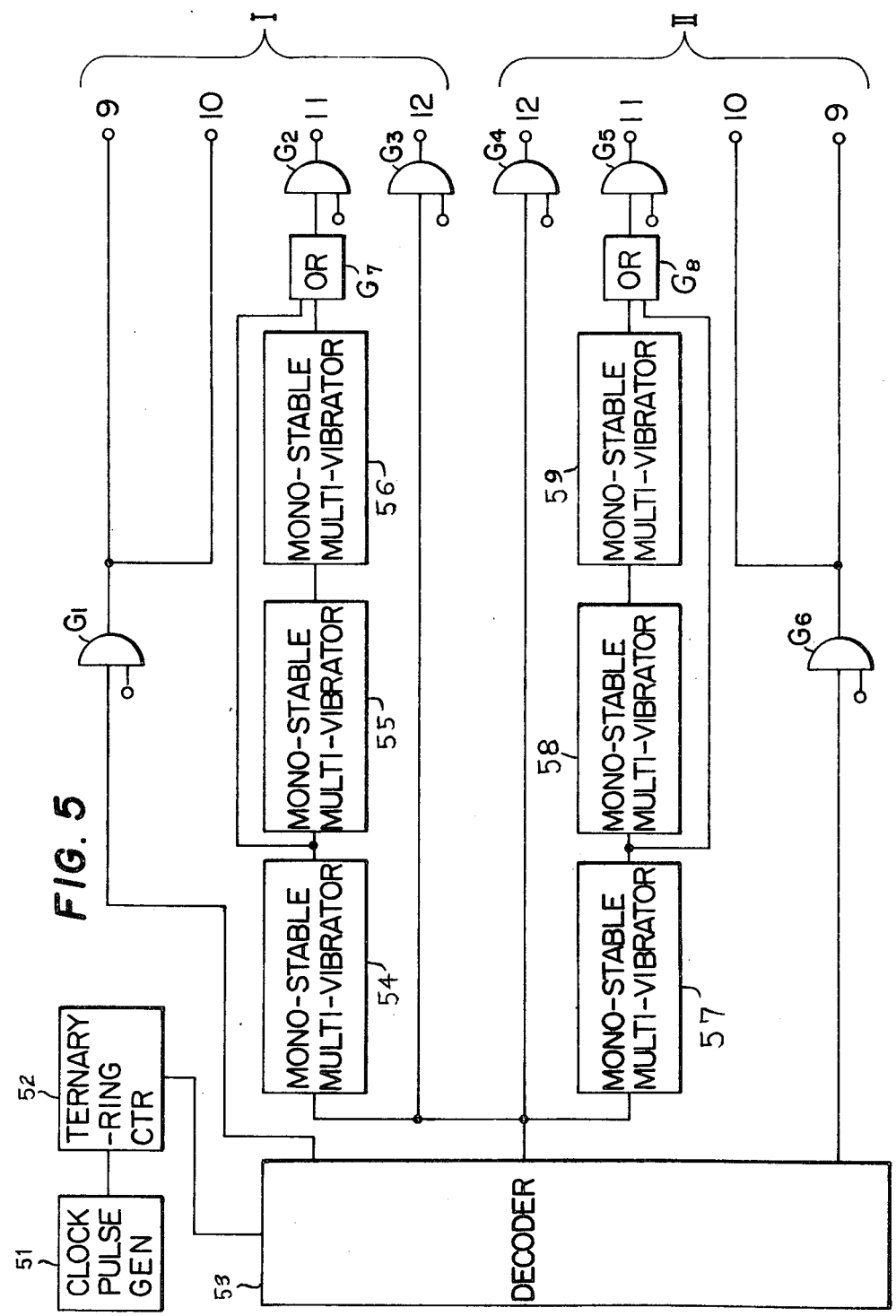
FIG. 5 is a circuit diagram showing the operation for driving the color modulator shown in FIG. 4b.

The electrodes of the polarization switching elements I and II which constitute a color modulator are connected to terminals 9,10,11 and 12, respectively. These 8 terminals are connected to a driver which, as shown in FIG. 5 comprises a clock pulse generator 51, a ternary ring counter, a decoder 53, gate circuits G1-G8 and monostable multivibrators (briefly MMV) 54 –59.

A timing pulse is generated by the clock pulse generator 51. This timing pulse causes the ternary ring counter 52 to generate four type of output signals, which are AND-gated by the decoder 53 into three different pulse trains with a delay of one pulse one after another. These pulses are supplied to 6 gates G1–G6, respectively, and amplified in terms of voltage and current to match the elements I and II. The first output supplied to the gate $G_1$ is applied to the terminals 12 and 10 of the element I. Part of the second output is supplied to the gates $G_3$ and $G_4$. The output of the gate $G_3$ is supplied to the terminal 12 of the element I. The rest of the second output is supplied to three MMVs 54, 55 and 56, and 57-59 and to two sets of gates $G_2$ and $G_5$ which are connected to OR gates G7 and G8 supplied with the outputs of the sets of three MMVs 54–56, and 57–59, respectively. The output of the gate $G_2$ is supplied to terminal 9 of the element I, and the output of gate $G_5$ is supplied to terminal 9 of the element II. The third output of decoder 53 is supplied to the gate $G_6$, and the resultant gate output is supplied to the terminals 12 and 10 of the element II. In this manner, the elements I and II can be operated by the output of the driver through the eight terminals.

More specifically, pulse voltages as indicated by the time (T) versus voltage (V) curves in FIGS. 6a and 6b are applied to the electrodes of the elements I and II. The curves 9,10,11 and 12 are pulse voltage waveforms to be supplied to the terminals 9,10,11 and 12 of the elements I and II, respectively. The sequence of colors (R,G,B) of these pulse voltages is matched with the time at which the total retardation assumes an interference color among R,G and B, as shown in FIG. 6c. By this arrangement, the color phase of the color modulator changes downward from the top of the screen, being synchronous with televison (TV) scanning line. In this operation, the velocity at which the boundary of color phases of the color modulator moves, i.e., the velocity at which the domain wall moves, should be adjusted to meet the velocity of the TV scanning line.

To this end, the timing of the pulse applied to the terminal 9 is adjusted by a MMV, and at the same time, the values of the gate load resistors, the resistances of which are all high, are determined so that the moving velocity of the domain wall can be controlled by limiting the switching current $i_s$ which flows as the domain wall moves. This switching current may be expressed in terms of variation in the charge Q in the area A of the electrode of the switching region. That is, $$i_s = \frac{dQ}{dt} = 2P_s \left( \frac{dA}{dt} \right) \tag{1}$$

where $P_s$ is the spontaneous polarization of $Gd_2(MoO_4)_3$ and $$\frac{dA}{dt}$$

is the variation in the area of a positive domain. The switching current $i_s$ flows through the gate load resistor R, resulting in a potential drop, $R_{is}$, across the resistor R. This potential drop will not exceed the power source voltage Va. Thus, $$i_s R \leq Va \tag{2}$$

Substituting Eq. 3 for Eq. (4)

$$R \leq \frac{Va}{2P_s} \left( \frac{dt}{dA} \right) \tag{3}$$

Assume now that Va = 200 volts and A = 20 × 15 mm². Then $P_s$ is 0.18 × 10⁻⁶ coul/cm², and dA/dt is 1.87 × 10⁻² m²/s (300 mm²/16 ms). Accordingly, R = 3 MΩ. By this load resistance, the switching current is limited and the switching time becomes 16ms. Thus, the boundary where the color phase changes moves from the top to the bottom of the screen over a period of 16ms. This is a sequential type solid-state color modulator of the invention used for mono-lens TV video camera.

One application of the domain switching element of the invention to the color modulator has been described above. The switching element of the invention may readily be used as a shutter for intercepting light beams, thereby erasing the picture on the screen in a certain direction at a constant speed. An example of this application will be described in Example 4 below.

EXAMPLE 4

Figure 7:
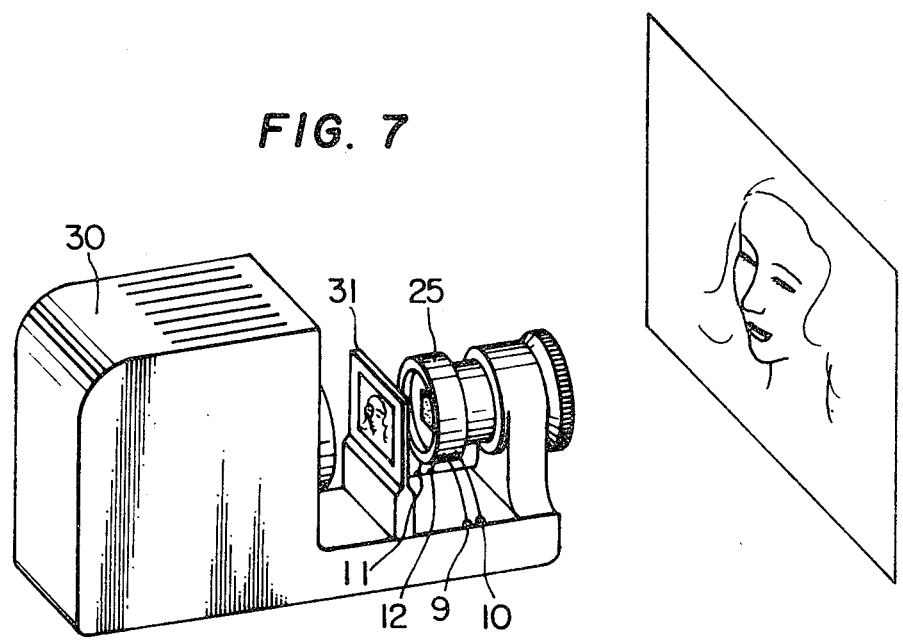
FIG. 7 is an illustration showing the principle of a partial image erasing element comprising the domain switching element of the invention used with a slide projector.

Two pieces of $Tb_2(MoO_4)_3$ c-plates are optically polished to a thickness of 325 μm, in the shape of 20mm × 20mm square, with its four sides oriented in the <110> direction. A nucleus region and a switching region are formed on one of these sample plates and a transparent electrode is installed thereon in the manner described in Examples 1 and 3. Lead wires are connected to the electrodes, and the element is fixed to a support base, as in Example 3. The other crystal plate is fixed to a support base without installing a nucleus region and an electrode thereon. These elements are inserted in a diagonal position between two polarizer plates 22 and 23 which are perpendicular to each other, as in Example 3. These elements are housed in a case 25 and molded. This is a photo-shutter element. As shown in FIG. 7, the shutter element is fastened to a slide projector 30. Assume now that the picture on slide 31 mounted on the projector is projected on a screen 32. When pulse voltages of a projection mode as indicated by a time (T) versus voltage (V) curve in FIG. 8a are applied to terminals 9, 10, and 11 relative to that applied to terminal 12, the picture emerges in sequence from the top of the screen towards the bottom, and the entire picture appears finally. Then, an erasing mode pulse voltage, in the waveform as in FIG. 8b, is applied, whereby the picture is erased in sequence from top to bottom, and the entire picture is erased. The slide is replaced with another side, and pictures are projected one after another in the same manner as described above. When the voltage applied to the terminal interchanged between 9 and 11, the projection and erasing of a picture on the screen is reversed, i.e., from bottom to top. This shutter element, when used in a projector, can operate at a higher speed and with greater accuracy than a mechanical shutter.

The above example relates to a method of controlling the direction in which a picture is partially projected or erased on the screen by the use of a photo-shutter element of the invention. It is readily feasible that colors of the picture on the screen may be partially changed by interposing therebetween a thin plate made of a substance such as quartz which exhibits double refraction, in the same manner as Example 3.

The domain switching element of this invention has extensive applications by viture of its useful properties evidenced in the foregoing embodiments where Example 1 shows the fundamentals of domain switching element, Example 2 the fundamentals of a color modulator, Example 3 fundamentals of a color modulator, and Example 4 fundamentals of the partial video eraser element. These are some preferred embodiments referred to for the purpose of illustrating the principles of the invention. Hence, it is apparent that the invention is not limited thereto or thereby but numerous modifications and changes may be made on the disclosure without departing from the scope of the claims which follow hereunder.

I claim:

1. A domain switching element comprising:
   an irregular ferroelectric crystal plate having first and second surfaces opposite one another, said plate containing multi-domain nucleus regions disposed in spaced-apart portions thereof;
   a first electrode layer disposed on a first portion of said first surface of said plate between said multi-domain nucleus regions therein;
   second and third electrode layers disposed on second and third portions of said first surface of said plate, respectively spaced apart from opposite edges of said first electrode layer, so as to overlie said multi-domain nucleus regions disposed in said spaced-apart portions of said plate, respectively; and
   a fourth electrode layer disposed on a first portion of said second surface of said plate between said spaced-apart portions of said plate containing said multi-domain nucleus regions.

2. A domain switching element according to claim 1, wherein a plurality of multi-domain nucleus regions, spaced apart from each other, are disposed in said plate beneath each of said second and third electrode layers.

3. A domain switching element according to claim 2, wherein said nucleus regions are stripe-shaped regions aligned with the <110> plane in said plate.

4. A domain switching element according to claim 1, wherein each of said first and second surfaces of said plate is orthogonal to the C-axis of the plate.

5. A domain switching element according to claim 1, wherein said opposite edges of said first electrode layer and said second and third electrode layers are aligned in the <110> direction of said plate.

6. A domain switching element according to claim 1, further including means for selectively coupling first and second voltages to said first, second, third and fourth electrode layers, to effect the movement of a domain wall across said plate between said nucleus regions, thereby switching the state of polarization of said plate beneath said fourth electrode layer.

7. A domain switching element according to claim 1, wherein said plate is a $Gd_2(MoO_4)_3$ C-plate.

8. A method of operating a domain switching element, said element comprising:
   an irregular ferroelectric crystal plate having first and second surfaces opposite one another, said plate containing multi-domain nucleus regions disposed in spaced-apart portions thereof;
   a first electrode layer disposed on a first portion of said first surface of said plate between said multi-domain nucleus regions therein;
   second and third electrode layers disposed on second and third portions of said first surface of said plate, respectively spaced-apart from opposite edges of said first electrode layer, so as to overlie said multi-domain nucleus regions disposed in said spaced-apart portions of said plate, respectively; and
   a fourth electrode layer disposed on a first portion of said second surface of said plate between said spaced-apart portions of said plate containing said multi-domain nucleus regions,
   said method comprising the steps of:
   a1. applying a first potential to said fourth electrode layer, while
   a2. applying a second potential to said first, second and third electrode layers and progressively increasing said second potential, thereby switching the portion of said plate between said spaced-apart portions thereof containing said multi-domain nucleus regions to a single prescribed state of polarization;
   b1. applying said second potential to said first and second electrode layers and said first potential to said third electrode layer, while
   b2. applying said first potential to said fourth electrode layer, thereby moving a domain wall defining the boundary between regions of opposite states of polarization into the portion of said plate between said second and third electrode layers; and c1. applying said second potential to said third electrode layer and said first potential to said fourth electrode layer, while c2. applying said second potential to said first and second electrode layers, thereby causing said domain wall to vanish in a nucleus domain region beneath said third electrode layer.

9. A method according to claim 8, further including the step of (d) repeating steps (a1), (a2), (b1), (b2), (c1) and (c2) at regular intervals with said first and second potentials being interchanged with each other for each consecutive interval.

* * * * *